(12) United States Patent
Matt

(10) Patent No.: US 7,181,015 B2
(45) Date of Patent: Feb. 20, 2007

(54) METHOD AND APPARATUS FOR CRYPTOGRAPHIC KEY ESTABLISHMENT USING AN IDENTITY BASED SYMMETRIC KEYING TECHNIQUE

(75) Inventor: Brian J. Matt, Riva, MD (US)

(73) Assignee: McAfee, Inc., Santa Clara, CA (US)

( * ) Notice: Subject to any disclaimer, the term of this patent is extended or adjusted under 35 U.S.C. 154(b) by 588 days.

(21) Appl. No.: 09/921,231

(22) Filed: Jul. 31, 2001

(65) Prior Publication Data
US 2003/0026433 A1    Feb. 6, 2003

(51) Int. Cl.
H04L 9/00    (2006.01)
(52) U.S. Cl. ..................................... 380/279
(58) Field of Classification Search ................ 380/278, 380/277, 279, 281, 44, 28
See application file for complete search history.

(56) References Cited

U.S. PATENT DOCUMENTS

| | | | |
|---|---|---|---|
| 4,386,233 A | 5/1983 | Smid et al. | 178/22.08 |
| 5,276,735 A | 1/1994 | Boebert et al. | 380/21 |
| 5,491,750 A * | 2/1996 | Bellare et al. | 713/155 |
| 5,539,824 A | 7/1996 | Bjorklund et al. | 380/21 |
| 5,864,667 A | 1/1999 | Barkan | 395/187.01 |

OTHER PUBLICATIONS

Menezes, Alfred, et al. Handbook of Applied Cryptography. CRC Press, 1997. pp. 33, 321-331, 352-368, 497-504.*
Schneier, Bruce. Applied Cryptography, second Edition: Protocols, Algorithms, and Source Code in C. John Wiley & Sons, 1996. pp. 30-31, 47-65, 115, 429-431, 455-459.*
Shamir, Adi. "Identity-Based Cryptosystems and Signature Signature Schemes". CRYPTO '84, LNCS 196, pp. 47-53, 1985.*
Gunther, Christoph. "An Identity-Based Key-Exchange Protocol". EUROCRYPT '89, LNCS 434, pp. 29-37, 1990.*
Miller, Newman, Schiller & Saltzer, "Kerberos Authentication and Authorization System" Project Athena Technical Plan, 1987.
J. Klohl and C. Newman, "The Kerberos Network Authentication Service (V5)" Network Working Group, Sep. 1993.
Otway and Ress, "Efficient and Timely Mutual Authentication" The ANSA Project.
Brandstad ed. "Computer Security and the Data Encryption Standard" National bureau of Standards, Feb. 1978.
Davis and Swick, "Network Security via Private Key Certificates" MIT Project Athena: Operating Systems Review, 1990.

* cited by examiner

Primary Examiner—Emmanuel L. Moise
Assistant Examiner—Zachary A. Davis
(74) Attorney, Agent, or Firm—Zilka-Kotab, PC; Christopher J. Hamaty

(57) ABSTRACT

One embodiment of the present invention provides a system for establishing a shared cryptographic key between participating nodes in a network. The system operates by sending a first message from the first node to the second node requesting establishment of a shared key. The second node sends a second message containing identifiers and a message authentication code to a key distribution center (KDC). The authentication code is generated using a second node key belonging to the second node. The KDC recreates the previously created second node key using the second node identifier and a secret key known only to the key distribution center. The KDC then verifies the message authentication code using the second node key. If the message authentication code is verified, the KDC creates a shared key for the nodes to use while communicating with each other. The KDC securely communicates this shared key to the participating nodes

13 Claims, 4 Drawing Sheets

METHOD AND APPARATUS FOR CRYPTOGRAPHIC KEY ESTABLISHMENT USING AN IDENTITY BASED SYMMETRIC KEYING TECHNIQUE

GOVERNMENT LICENSE RIGHTS

This invention was made with United States Government support under contract #F30602-99-C-0185 funded by the Defense Advanced Research Projects Agency (DARPA) through Rome Laboratories. The United States Government has certain rights in the invention.

BACKGROUND

1. Field of the Invention

The present invention relates to cryptographic keys. More specifically, the present invention relates to a method and an apparatus for establishing a cryptographic key using an identity based symmetric keying technique.

2. Related Art

Users of modern networked computing and communication systems routinely use cryptographic techniques when communicating with other systems to prevent disclosure of the contents of the communications and to authenticate the source of the communications. In general, these cryptographic techniques and algorithms are well known and are easily implemented. One of the hardest problems in using these cryptographic techniques is to establish a shared key to encrypt communications between nodes.

Conventional cryptographic mechanisms for key establishment either lack the required flexibility or are too expensive to use in wireless, resource-limited ad-hoc networks. Expensive, in this context, means that these key establishment mechanism require excessive electrical energy, excessive time, excessive computing power, excessive bandwidth, or a combination of these along with other factors. Many ad-hoc networks facilitate wireless communications among participating fixed and mobile units without relying on existing infrastructure, such as the towers and landlines that make up the current cellular telephone systems or on satellites and ground stations.

Existing key establishment techniques rely either on public key cryptography or on symmetric key cryptography combined with special trusted devices called key distribution centers (KDCs) or key translation centers (KTCs). The problem with public key based techniques is that they are expensive; requiring excessive energy, time, and computing power. The problem with symmetric key based techniques is that, while they are relatively efficient, they lack flexibility. For example, key distribution schemes such as Kerberos (Miller, Neuman, Schiller & Saltzer, "Kerberos Authentication and Authorization System", Project Athena Technical Plan, 1987) and Otway-Rees (Otway and Rees, "Efficient and Timely Mutual Authentication", Operating Systems Review, 21 (1987) 8–10) protocols require that their databases be updated whenever an unfamiliar unit participates in a key establishment session with any KDC. These databases contain the keys that the KDC shares with other nodes. This inflexibility can be addressed by updating the database of the KDC; however, since the KDC can itself be a wireless node, and perhaps a mobile node, this update is expensive both in terms of energy and bandwidth.

What is needed is a method and an apparatus that provides for establishing shared cryptographic keys between participating nodes without the difficulties listed above.

SUMMARY

One embodiment of the present invention provides a system for establishing a shared cryptographic key between participating nodes in a network. The system operates by sending a first message from the first node to the second node requesting establishment of a shared key. The second node sends a second message containing identifiers and a message authentication code to a key distribution center (KDC). The authentication code is generated using a second node key belonging to the second node. The KDC recreates the previously created second node key using the second node's identifier and a secret key known only to the key distribution center. The KDC then verifies the message authentication code using the second node key. If the message authentication code is verified, the KDC creates a shared key for the nodes to use while communicating with each other. The KDC securely communicates this shared key to the participating nodes.

In one embodiment of the present invention, the KDC encrypts a hash value and the shared key using the second node's key to create a first encrypted key. The KDC also recreates the previously created first node key using its secret key and the identifier of the first node. The KDC encrypts the hash value and the shared key using the first node's key. The KDC sends both of these encrypted values to the second node in a third message. The second node decrypts the values in the message to recover the hash value and the shared key. The second node verifies the hash value and uses the hash value to verify that the message came from the KDC. When the hash value has been verified, the second node sends a fourth message to the first node that includes the encrypted hash value and shared key that has been encrypted with the first node's key. The first node decrypts the encrypted values to recover the hash value and the shared key. Next, the first node verifies the hash value to ensure that the key was created by the KDC and uses the shared key to establish that the second node has the shared key. After the hash value has been verified and it has been established that the second node has the shared key, the first node sends a fifth message to the second node using the shared key so that the second node can confirm that the shared key has been established. The second node then verifies that the first node has the shared key.

In one embodiment of the present invention, the first message includes the first node's identifier, the second node's identifier, the KDC's identifier, and a nonce. A nonce is a random number selected for message confirmation purposes that has a statistically low probability of being reused.

In one embodiment of the present invention, the second message includes the KDC's identifier, the second node's identifier, the first node's identifier, a nonce created by the second node, the first node's nonce, and a message authentication code. The message authentication code is created from the KDC's identifier, the second node's identifier, the first node's identifier, the second node's nonce, and the first node's nonce. The message authentication code is created using the second node's key.

In one embodiment of the present invention, the KDC verifies the message authentication code by creating a test message authentication code from the KDC's identifier, the second node's identifier, the first node's identifier, the second node's nonce, and the first node's nonce using the second node's key. The KDC compares the test message authentication code with the message authentication code.

In one embodiment of the present invention, the KDC creates the hash value from the second node's identifier, the first node's identifier, the second node's nonce, and the first node's nonce.

In one embodiment of the present invention, the third message includes the second node's identifier, the first node's identifier, the values encrypted with the second node's key, and the values encrypted with the first node's key.

In one embodiment of the present invention, the second node validates the hash value by decrypting the values encrypted with the second node's key. The second node then creates a test hash value from the second node's identifier, the first node's identifier, the second node's nonce, and the first node's nonce. The second node compares the test hash value with the hash value.

In one embodiment of the present invention, the fourth message includes the first node's identifier, the second node's identifier, the second node's nonce, the values encrypted by the KDC using the first node's key, and a confirmation value that has been encrypted with the shared key.

In one embodiment of the present invention, the first confirmation value includes the second node's nonce and the first node's nonce.

In one embodiment of the present invention, the first node verifies the hash value by creating a test hash value from the second node's identifier, the first node's identifier, the second node's nonce, and the first node's nonce. The test hash value is compared with the received hash value.

In one embodiment of the present invention, the first node establishes that the second node has the cryptographic key by decrypting the first node's confirmation value using the cryptographic key. The first node then verifies that the first node's nonce is what was sent in the first message.

In one embodiment of the present invention, the fifth message includes the second node's identifier, the first node's identifier, and a confirmation value created by the first node.

In one embodiment of the present invention, the first node creates the confirmation value by reordering the first node's nonce and the second node's nonce recovered by decrypting the received confirmation value. This confirmation value is encrypted node's using the cryptographic key.

In one embodiment of the present invention, the second node confirms that the cryptographic key has been established by decrypting the confirmation value received from the first node using the cryptographic key. The second node then verifies that the second node's nonce was received in the confirmation value.

In one embodiment of the present invention, the second node's key is created using the KDC's secret key and the second node's identifier. The second node's key is installed into the second node prior to deployment of the second node.

In one embodiment of the present invention, the first node's key is created using the KDC's secret key and the first node's identifier. The first node's key is installed into the first node prior to deployment of the first node.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Nodes

Figure 1:
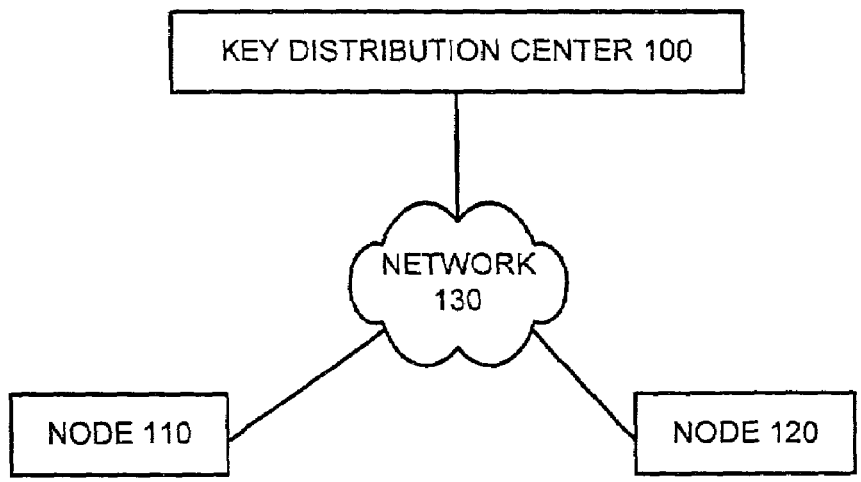
FIG. 1 illustrates computing nodes coupled to key distribution center 100 in accordance with an embodiment of the present invention.

FIG. 1 illustrates computing nodes coupled to key distribution center 100 in accordance with an embodiment of the present invention. Computing nodes 110 and 120 are coupled to key distribution center 100 across network 130.

Key distribution center 100 and computing nodes 110 and 120 can generally include any type of computer system, including, but not limited to, a computer system based on a microprocessor, a mainframe computer, a digital signal processor, a portable computing device, a personal organizer, a device controller, and a computational engine within an appliance. Key distribution center 100 and computing nodes 110 and 120 can include mobile secure communication devices, which have embedded computer processors. A practitioner with ordinary skill in the art will readily recognize that, while establishing a shared cryptographic key involves only one key distribution center and two nodes, the system can include more than one key distribution center and more than two nodes.

Network 130 can generally include any type of wire or wireless communication channel capable of coupling together computing nodes. This includes, but is not limited to, a local area network, a wide area network, or a combination of networks. In one embodiment of the present invention, network 130 includes a wireless communication network.

Key Distribution Center

Figure 2:
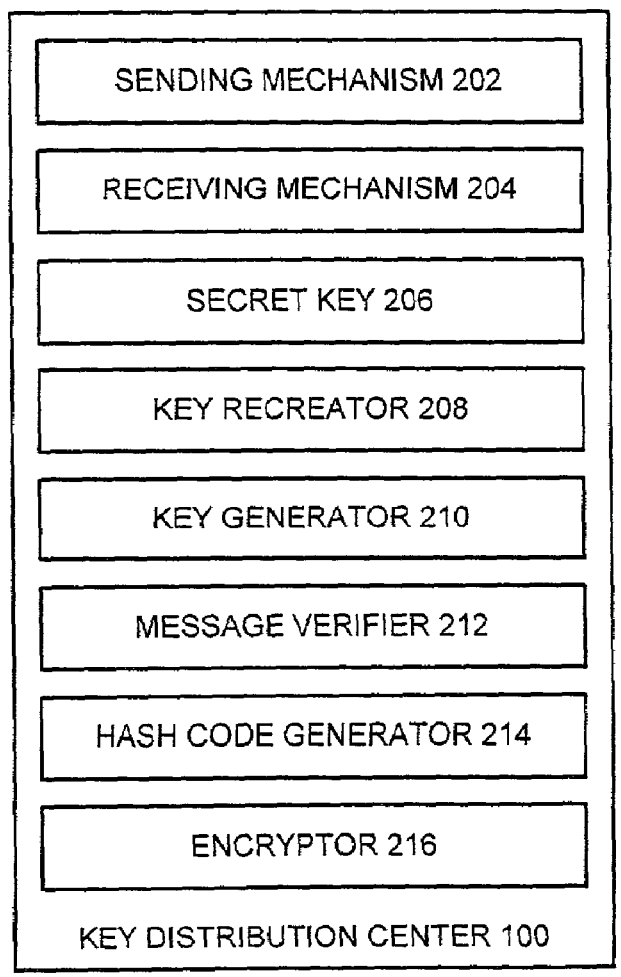
FIG. 2 illustrates key distribution center 100 in accordance with an embodiment of the present invention.

FIG. 2 illustrates key distribution center 100 in accordance with an embodiment of the present invention. Key distribution center 100 includes sending mechanism 202, receiving mechanism 204, secret key 206, key recreator 208, key generator 210, message verifier 212, hash code generator 214, and encryptor 216.

Sending mechanism 202 provides the capability of sending messages from key distribution center 100 to other nodes, for example nodes 110 and 120. Receiving mechanism 204 provides the capability of receiving messages at key distribution center 100 from other nodes, for example nodes 110 and 120.

Secret key 206 is typically known only to key distribution center 100 but, with reduced security, may be shared by other KDCs and may be known by a central storage facility. Note that key distribution center 100 does not have a database of shared keys for each node in the system. Each node in the system has a private key, which was generated using secret key 206 and the identity of the individual node. Key recreator 208 recreates these keys using the identity of any node that is in communication with key distribution center 100.

Key generator 210 generates cryptographic keys to be shared between nodes such as node 110 and node 120 that desire to communicate. Key generator 210 can use any well-known technique for generating the shared key, optionally using inputs provided by the node (e.g. the nonces).

Message verifier 212 verifies the authenticity of messages received by comparing unique values within the message with values that should be in the message. The operation of message verifier 212 is explained below in conjunction with FIG. 6.

Hash code generator 214 can use any available hash algorithm to create a hash code of the values presented to hash code generator 214. An example of a hash algorithm is secure hash algorithm one (SHA-1).

Encryptor 216 performs encryption using any available symmetric key algorithm. Well-known examples of symmetric key encryption algorithms are Data Encryption Standard (DES), triple DES, and Advanced Encryption Standard (AES).

Computing Node 110

Figure 3:
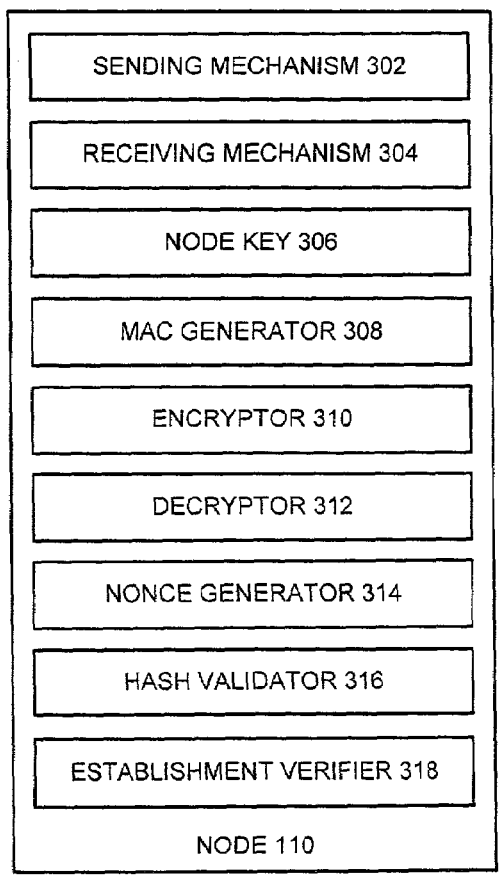
FIG. 3 illustrates computing node 110 in accordance with an embodiment of the present invention.

FIG. 3 illustrates computing node 110 in accordance with an embodiment of the present invention. Node 110 includes sending mechanism 302, receiving mechanism 304, node key 306, MAC generator 308, encryptor 310, decryptor 312, nonce generator 314, hash validator 316, and key establishment verifier 318.

Sending mechanism 302 provides the capability of sending messages from node 110 to other nodes, for example node 120 and to key distribution center 100. Receiving mechanism 304 provides the capability of receiving messages at node 110 from other nodes, for example node 120 and from key distribution center 100.

Node key 306 is generated using secret key 206 belonging to key distribution center 100 and the identity of node 110. Node key 306 is specific to node 110, but can be regenerated by key distribution center 100 from the identity of node 110 by using secret key 206. One way of generating node key 306 is to encrypt the identity of node 110 using secret key 206. Node key 306 is loaded into node 110 prior to deployment of node 110.

MAC generator 308 can generate message authentication codes for messages being sent from node 110. Typically, a message authentication code is created using a cryptographic process, which encrypts part of the message being sent using a block-chaining method and uses the output of the final round of chaining as the message authentication code.

Encryptor 310 performs encryption using any available symmetric key algorithm. Well-known examples of symmetric key encryption algorithms are Data Encryption Standard (DES), triple DES, and Advanced Encryption Standard (AES). Decryptor 312 performs decryption using the same algorithm as encryptor 216. Note that encryptor 310 and decryptor 312 also use the same algorithm as encryptor 216 in key distribution center 100.

Nonce generator 314 generates random values called nonces, which can be used to validate that a message received by node 110 is in response to a message sent from node 110. A nonce has a statistically low probability of being reused.

Hash validator 316 validates the hash code in a message received from key distribution center 100. Hash validator 316 uses the same hash algorithm as hash code generator 214. In operation, hash validator 316 generates a test hash code using the same input values that were used by hash code generator 214. The test hash value is compared with the received hash value. The hash code is valid if both values are the same.

Establishment verifier 318 verifies that a second node, say node 120, has the shared key being established. This verification is described in detail in conjunction with FIG. 6.

Computing Node 120

Figure 4:
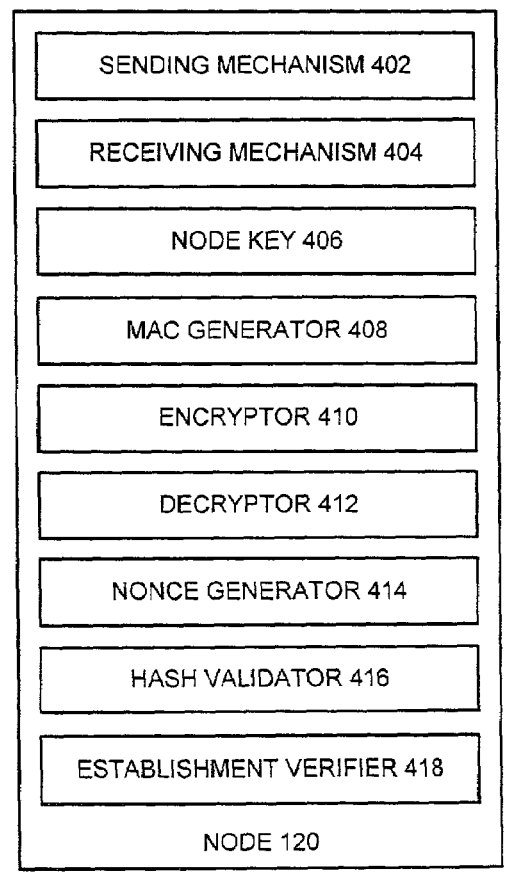
FIG. 4 illustrates computing node 120 in accordance with an embodiment of the present invention.

FIG. 4 illustrates computing node 120 in accordance with an embodiment of the present invention. Node 120 includes sending mechanism 402, receiving mechanism 404, node key 406, MAC generator 408, encryptor 410, decryptor 412, nonce generator 414, hash validator 416, and key establishment verifier 418. Node 120 is symmetric with node 110, and any other node in the system. Details of the components within node 120 are as described for node 110 in conjunction with FIG. 3 above. Both nodes have been described to allow reference to both nodes in conjunction with the descriptions of FIGS. 5 and 6.

Activity Diagram

Figure 5:
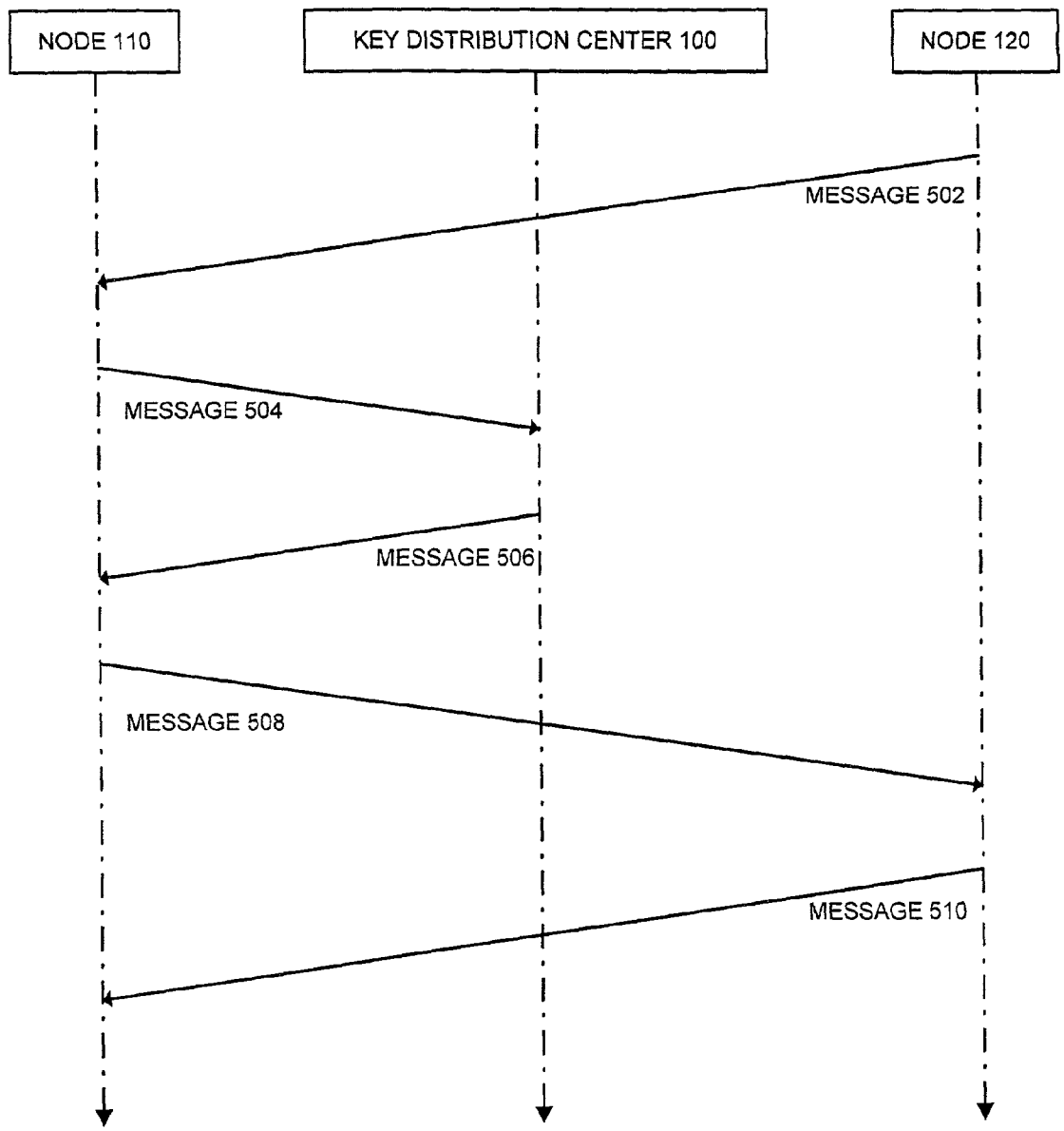
FIG. 5 is an activity diagram illustrating message flow related to time in accordance with an embodiment of the present invention.

FIG. 5 is an activity diagram illustrating message flow related to time in accordance with an embodiment of the present invention. Note that since node 110 and node 120 are symmetric, either node can take on either role as described below. In FIG. 5, the flow of time is from the top of the activity diagram to the bottom of the activity diagram. The system starts when node 120 sends message 502 to node 110 requesting a shared key for communications. The contents of all messages described in conjunction with FIG. 5 are presented in the detailed discussion of FIG. 6.

Node 110 subsequently receives message 502 and generates an authenticated request for a shared key. The authenticated request is sent to key distribution center 100 in message 504. When key distribution center 100 receives message 504, key distribution center 100 validates the authenticated request. If the request is valid, key distribution center 100 creates a shared key for nodes 110 and 120. The shared key, along with validation data, is encrypted using the node key of both node 110 and node 120. Both of these encrypted values are sent to node 110 in message 506.

Upon receipt of message 506, node 110 decrypts the copy of the key encrypted with its node key, and then checks the validation received with the shared key. If the key is valid, node 110 generates proof that it has the shared key. The proof that it has the shared key is sent, along with the copy of the key encrypted using the node key for node 120, to node 120 in message 508.

When node 120 receives message 508, node 120 decrypts the shared key and checks the validation received with the shared key. If the shared key is valid, node 120 verifies the proof that node 110 has the shared key. After verifying the proof that node 110 has the shared key, node 120 generates proof that node 120 has the shared key. Node 120 sends this proof to node 110 in message 510.

When node 110 receives message 510, node 110 verifies the proof that node 120 has the shared key. When the proof is verified, secure communications between nodes 110 and 120 can commence.

Establishing the Shared Cryptographic Key

Figure 6:
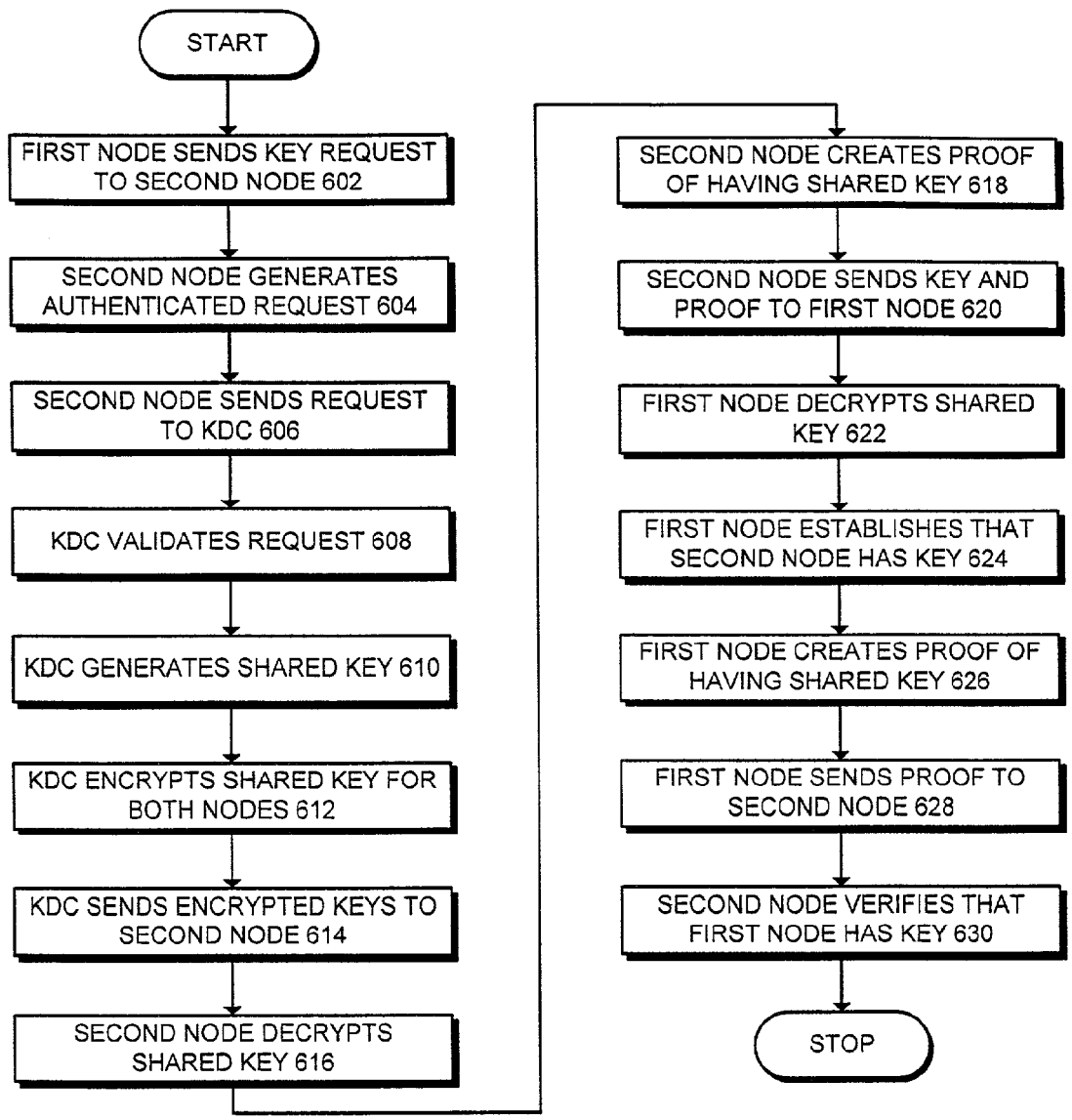
FIG. 6 is a flowchart illustrating establishing a shared cryptographic key in accordance with an embodiment of the present invention.

FIG. 6 is a flowchart illustrating establishing a shared cryptographic key in accordance with an embodiment of the present invention. The system starts when sending mechanism 402 in node 120 sends message 502 to node 110 requesting that a shared key be established (step 602). Message 502 includes:

$ID_A\|ID_B\|KDC_J\|N_B$ where $ID_A$ is the identifier of node 120, $ID_B$ is the identifier of node 110, $KDC_J$ is the identifier of key distribution center 100, $N_B$ is a nonce generated by node 120, and ∥ indicates concatenation.

When receiving mechanism 304 at node 110 receives message 502, node 110 generates an authenticated request for a shared key (step 604). The authenticated request includes:

$KDC_J\|ID_A\|ID_B\|N_A\|N_B\|M(K_{AJ}, KDC_J\|ID_A\|ID_B\|N_A\|N_B)$ where $N_A$ is a nonce generated by node 110, $K_{AJ}$ is node key 306 and $M(K_{AJ}, KDC_J\|ID_A\|ID_B\|N_A\|N_B)$ is a message authentication code generated by MAC generator 308 using $K_{AJ}$ and $KDC_J\|ID_A\|ID_B\|N_A\|N_B$. Sending mechanism 302 in node 110 sends the authenticated request to key distribution center 100 in message 504 (step 606).

After receiving mechanism 204 receives message 504, message verifier 212 validates the request (step 608). The request is validated by first recreating node key 306 within key recreator 208 using secret key 206 and $ID_A$. Message verifier 212 validates the request by recreating $M(K_{AJ}, KDC_J\|ID_A\|ID_B\|N_A\|N_B)$ and comparing the recreated version with the version received in message 504. If both versions match, the request is valid.

Next, key generator 210 generates shared cryptographic key $K_{AB}$ for use between node 110 and node 120 (step 610). Key recreator 208 recreates node key 406 belonging to node 120 by using secret key 206 and $ID_B$. Hash code generator 214 generates $H(ID_A\|ID_B\|N_A\|N_B)$. Encryptor 216 creates encrypted values $E(K_{AJ}, H(ID_A\|ID_B\|N_A\|N_B)\|K_{AB})$ and $E(K_{BJ}, H(ID_A\|ID_B\|N_A\|N_B)\|K_{AB})$, where $K_{BJ}$ is node key 406 (step 612).

Sending mechanism 202 then sends message 506 to node 110 (step 614). Message 506 includes:

$ID_A\|ID_B\|$ $E(K_{AJ}, H(ID_A\|ID_B\|N_A\|N_B)\|K_{AB})\|$ $E(K_{BJ}, H(ID_A\|ID_B\|N_A\|N_B)\|K_{AB})$.

When receiving mechanism 304 receives message 506, decryptor 312 decrypts $E(K_{AJ}, H(ID_A\|ID_B\|N_A\|N_B)\|K_{AB})$ using $K_{AJ}$ thereby recovering $H(ID_A\|ID_B\|N_A\|N_B)\|K_{AB}$ (step 616). Hash validator 316 then validates $H(ID_A\|ID_B\|N_A\|N_B)$. Establishment verifier 318 then creates encrypted value $E(K_{AB}, N_A\|N_B)$ as proof that node 110 has $K_{AB}$ (step 618).

Next, sending mechanism 302 sends message 508 to node 120 (step 620). Message 508 includes:

$ID_B\|ID_A\|N_A\|$ $E(K_{BJ}, H(ID_A\|ID_B\|N_A\|N_B)\|K_{AB})\|$ $E(K_{AB}, N_A\|N_B)$.

When receiving mechanism 404 receives message 508, decryptor 412 decrypts $E(K_{BJ}, H(ID_A\|ID_B\|N_A\|N_B)\|K_{AB})$ using $K_{BJ}$ thereby recovering $H(ID_A\|ID_B\|N_A\|N_B)\|K_{AB}$. Hash validator 416 validates $H(ID_A\|ID_B\|N_A\|N_B)$. Decryptor 412 then decrypts $E(K_{AB}, N_A\|N_B)$ recovering $N_A\|N_B$ (step 622). Establishment verifier 418 establishes that node 110 has $K_{AB}$ by comparing the recovered $N_B$ with the original $N_B$ (step 624).

After establishing that node 110 has $K_{AB}$, establishment verifier 418 creates $N_B\|N_A$ as proof that node 120 has $K_{AB}$ (step 626). Encryptor 410 encrypts $N_B\|N_A$ using the shared key creating $E(K_{AB}, N_B\|N_A)$. Sending mechanism 402 sends message 510 to node 110 (step 628). Message 510 includes:

$ID_A\|ID_B\|E(K_{AB}, N_B\|N_A)$.

When receiving mechanism 304 receives message 510, decryptor 312 decrypts $E(K_{AB}, N_B\|N_A)$ recovering $N_B\|N_A$. Establishment verifier 318 verifies that node 120 has $K_{AB}$ by comparing the decrypted copy of $N_A$ with the original value of $N_A$ and optionally, by comparing the decrypted copy of $N_B$ with the original value of $N_B$.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for establishing a cryptographic key between a first node and a second node, comprising:
   sending a first message from the first node to the second node, wherein the first message requests establishing the cryptographic key;
   sending a second message from the second node to a key distribution center, wherein the second message includes a first node identifier for the first node, a second node identifier for the second node, and a message authentication code created using a second node key belonging to the second node;
   recreating the second node key at the key distribution center, wherein the second node key was previously created using the second node identifier and a secret key known only to the key distribution center;
   verifying at the key distribution center the message authentication code in the second message using the second node key; and
   if the message authentication code is verified,
      creating the cryptographic key at the key distribution center, and
      communicating the cryptographic key to the second node and the first node;
   wherein an update of a key distribution center database of shared keys is capable of being avoided when at least one of the nodes is unfamiliar;
   wherein communicating the cryptographic key to the second node and the first node includes:

encrypting a hash value and the cryptographic key using the second node key to create a first encrypted key;
recreating a first node key belonging to the first node, wherein the first node key was previously created using the secret key and the first node identifier;
encrypting the hash value and the cryptographic key using the first node key to create a second encrypted key;
sending a third message from the key distribution center to the second node, wherein the third message includes the first encrypted key and the second encrypted key;
decrypting at the second node the first encrypted key from the third message to recover the hash value and the cryptographic key;
verifying the hash value at the second node; and
if the hash value is verified at the second node,
    sending a fourth message to the first node from the second node, wherein the fourth message includes the second encrypted key and a key confirmation value so that the first node can confirm that the cryptographic key has been established,
    decrypting at the first node the second encrypted key from the fourth message to recover the hash value and the cryptographic key,
    verifying the hash value at the first node,
    establishing at the first node that the second node has the cryptographic key, and
    if the hash value is verified at the first node and it is established at the first node that the second node has the cryptographic key,
sending a fifth message to the second node from the first node so that the second node can confirm that the cryptographic key has been established;
wherein the first message includes the first node identifier, the second node identifier, a third identifier for the key distribution center, and a first nonce, wherein a nonce is a random number selected for message confirmation purposes that has a statistically low probability of being reused;
wherein the second message includes the third identifier, the second node identifier, the first node identifier, a second nonce, the first nonce, and the message authentication code, wherein the message authentication code is created from the third identifier, the second node identifier, the first node identifier, the second nonce, and the first nonce;
wherein verifying the message authentication code includes:
    creating a test message authentication code from the third identifier, the second node identifier, the first node identifier, the second nonce, and the first nonce using the second node key; and
    comparing the test message authentication code with the message authentication code;
wherein the hash value is created from the second node identifier, the first node identifier, the second nonce, and the first nonce;
wherein the third message includes the second node identifier, the first node identifier, the second encrypted key, and the first encrypted key.

2. The method of claim 1, wherein verifying the hash value at the second node includes:
    creating a first test hash value from the second node identifier, the first node identifier, the second nonce, and the first nonce; and
    comparing the first test hash value with the hash value.

3. The method of claim 2, wherein the fourth message includes the first node identifier, the second node identifier, the second nonce, the first encrypted key, and a first confirmation value, wherein the first confirmation value has been encrypted with the cryptographic key.

4. The method of claim 3, wherein the first confirmation value includes the second nonce and the first nonce.

5. The method of claim 4, wherein verifying the hash value at the first node includes:
    creating a second test hash value from the second node identifier, the first node identifier, the second nonce, and the first nonce; and
    comparing the second test hash value with the hash value.

6. The method of claim 5, wherein establishing at the first node that the second node has the cryptographic key includes:
    decrypting the first confirmation value using the cryptographic key; and
    verifying that the first nonce is what was sent in the first message.

7. The method of claim 6, wherein the fifth message includes:
    the second node identifier, the first node identifier, and a second confirmation value.

8. The method of claim 7, wherein creating the second confirmation value at the first node includes:
    reordering the first nonce and the second nonce recovered by decrypting the first confirmation value to create the second confirmation value; and
    encrypting the second confirmation value using the cryptographic key.

9. The method of claim 8, wherein confirming at the second node that the cryptographic key has been established includes:
    decrypting the second confirmation value using the cryptographic key; and
    verifying that the second nonce was sent in the second message.

10. The method of claim 1, further comprising
    creating the second node key, wherein the second node key is created using the secret key and the second node identifier; and
    installing the second node key into the second node prior to deployment of the second node.

11. The method of claim 1, further comprising:
    creating the first node key, wherein the fast node key is created using the secret key and the first node identifier; and
    installing the first node key into the first node prior to deployment of the first node.

12. A computer-readable storage medium storing instructions that when executed by a computer cause the computer to perform a method for establishing a cryptographic key between a first node and a second node, the method comprising:
    sending a first message from the first node to the second node, wherein the first message requests establishing the cryptographic key;
    sending a second message from the second node to a key distribution center, wherein the second message includes a first node identifier for the first node, a second node identifier for the second node, and a message authentication code created using a second node key belonging to the second node;
    recreating the second node key at the key distribution center, wherein the second node key was previously created using the second node identifier and a secret key known only to the key distribution center;

verifying at the key distribution center the message authentication code in the second message using the second node key; and if the message authentication code is verified,
creating the cryptographic key at the key distribution center, and
communicating the cryptographic key to the second node and the first node;

wherein an update of a key distribution center database of shared keys is capable of being avoided when at least one of the nodes is unfamiliar;

wherein communicating the cryptographic key to the second node and the first node includes:

encrypting a hash value and the cryptographic key using the second node key to create a first encrypted key;

recreating a first node key belonging to the first node, wherein the first node key was previously created using the secret key and the first node identifier;

encrypting the hash value and the cryptographic key using the first node key to create a second encrypted key;

sending a third message from the key distribution center to the second node, wherein the third message includes the first encrypted key and the second encrypted key;

decrypting at the second node the first encrypted key from the third message to recover the hash value and the cryptographic key;

verifying the hash value at the second node and if the hash value is verified at the second node,
sending a fourth message to the first node from the second node, wherein the fourth message includes the second encrypted key,
decrypting at the first node the second encrypted key from the fourth message to recover the hash value and the cryptographic key,
verifying the hash value at the first node,
establishing at the first node that the second node has the cryptographic key, and
if the hash value is verified at the first node and it is established at the first node that the second node has the cryptographic key, sending a fifth message to the second node from the first node so that the second node can confirm that the cryptographic key has been established;

wherein the first message includes the first node identifier, the second node identifier, a third identifier for the key distribution center, and a first nonce, wherein a nonce is a random number selected for message confirmation purposes that has a statistically low probability of being reused;

wherein the second message includes the third identifier, the second node identifier, the first node identifier, a second nonce, the first nonce, and the message authentication code, wherein the message authentication code is created from the third identifier, the second node identifier, the first node identifier, the second nonce, and the first nonce;

wherein verifying the message authentication code includes:
creating a test message authentication code from the third identifier, the second node identifier, the first node identifier, the second nonce, and the first nonce using the second node key; and
comparing the test message authentication code with the message authentication code;

wherein the hash value is created from the second node identifier, the first node identifier, the second nonce, and the first nonce;

wherein the third message includes the second node identifier, the first node identifier, the second encrypted key, and the first encrypted key.

13. An apparatus that facilitates establishing a cryptographic key between a first node and a second node, comprising:

a first sending mechanism that is configured to send a first message from the first node to the second node, wherein the first message requests establishing the cryptographic key;

a second sending mechanism that is configured to send a second message from the second node to a key distribution center, wherein the second message includes a first node identifier for the first node, a second node identifier for the second node, and a message authentication code created using a second node key belonging to the second node;

a key recreating mechanism that is configured to recreate the second node key at the key distribution center, wherein the second node key was previously created using the second node identifier and a secret key known only to the key distribution center;

a first verifying mechanism at the key distribution center that is configured to verify the message authentication code in the second message using the second node key;

a creating mechanism that is configured to create the cryptographic key at the key distribution center;

a communicating mechanism that is configured to communicate the cryptographic key to the second node and the first node;

an encrypting mechanism that is configured to encrypt a hash value and the cryptographic key using the second node key to create a first encrypted key;

the key recreating mechanism that is further configured to recreate a first node key belonging to the first node, wherein the first node key was previously created using the secret key and the first node identifier;

the encrypting mechanism that is further configured to encrypt the hash value and the cryptographic key using the first node key to create a second encrypted key;

a third sending mechanism that is configured to send a third message from the key distribution center to the second node, wherein the third message includes the first encrypted key and the second encrypted key;

a first decrypting mechanism at the second node that is configured to decrypt the first encrypted key from the third message to recover the hash value and the cryptographic key;

a second verifying mechanism at the second node that is configured to verify the hash value; and the second sending mechanism that is further configured to send a fourth message to the first node from the second node, wherein the fourth message includes the second encrypted key, a second decrypting mechanism at the first node that is configured to decrypt the second encrypted key from the fourth message to recover the hash value and the cryptographic key, a third verifying mechanism at the first node that is configured to verify the hash value, an establishing mechanism at the first node that is configured to establish that the second node has the cryptographic key, and the first sending mechanism that is further configured to send a fifth message to the second node from the first node so that the second node can confirm that the cryptographic key has been established;

wherein an update of a key distribution center database of shared keys is capable of being avoided when at least one of the nodes is unfamiliar;

wherein the first message includes the first node identifier, the second node identifier, a third identifier for the key distribution center, and a first nonce, wherein a nonce is a random number selected for message confirmation purposes that has a statistically low probability of being reused;

wherein the second message includes the third identifier, the second node identifier, the first node identifier, a second nonce, the first nonce, and the message authentication code, wherein the message authentication code is created from the third identifier, the second node identifier, the first node identifier, the second nonce, and the first nonce;

wherein verifying the message authentication code includes:
creating a test message authentication code from the third identifier, the second node identifier, the first node identifier, the second nonce, and the first nonce using the second node key; and
comparing the test message authentication code with the message authentication code;

wherein the hash value is created from the second node identifier, the first node identifier, the second nonce, and the first nonce;

wherein the third message includes the second node identifier, the first node identifier, the second encrypted key, and the first encrypted key.

* * * * *

UNITED STATES PATENT AND TRADEMARK OFFICE
CERTIFICATE OF CORRECTION

PATENT NO.         : 7,181,015 B2
APPLICATION NO.    : 09/921231
DATED              : February 20, 2007
INVENTOR(S)        : Matt It is certified that error appears in the above-identified patent and that said Letters Patent is hereby corrected as shown below:

Col. 10, line 11, replace "bash" with -- hash --;
    Col. 10, line 37, replace "comprising" with -- comprising: --;
    Col. 10, line 44, replace "fast" with -- first --;
    Col. 11, line 27, replace "node" with -- node; --.

Signed and Sealed this

Fifth Day of October, 2010

David J. Kappos
*Director of the United States Patent and Trademark Office*